United States Patent [19]

Wolf

[11] 4,180,237

[45] Dec. 25, 1979

[54] HYDRAULIC VALVE SYSTEM

[76] Inventor: Clyde C. Wolf, 4100 E. 60th Ave., Commerce City, Colo. 80022

[21] Appl. No.: 803,621

[22] Filed: Jun. 6, 1977

[51] Int. Cl.² .................. F16K 31/143; F16K 31/122
[52] U.S. Cl. ........................................ 251/57; 60/592; 91/460; 188/315
[58] Field of Search ................ 60/583, 586, 588, 592; 137/344; 251/57; 91/460; 188/315, 316, 317, 318, 319

[56] References Cited

U.S. PATENT DOCUMENTS

| 874,106 | 12/1907 | McCarroll | 251/57 |
|---|---|---|---|
| 1,707,063 | 3/1929 | Loughead et al. | 60/586 |
| 2,213,946 | 9/1940 | Bowen | 60/588 |
| 2,447,142 | 8/1948 | Smith et al. | 60/586 |
| 2,564,137 | 8/1951 | Wahlberg | 60/592 |
| 3,044,267 | 7/1962 | Hicks | 60/588 |
| 3,065,604 | 11/1962 | Randol | 60/588 |
| 3,704,718 | 12/1972 | Rudel | 251/57 |
| 3,905,523 | 9/1975 | Ahlers et al. | 137/344 |

FOREIGN PATENT DOCUMENTS

| 1159003 | 12/1963 | Fed. Rep. of Germany | 251/57 |
|---|---|---|---|
| 377537 | 12/1939 | Italy | 60/586 |

*Primary Examiner*—Martin P. Schwadron
*Assistant Examiner*—G. L. Walton
*Attorney, Agent, or Firm*—Richard D. Law

[57] ABSTRACT

A self contained hydraulic valve system, for controlling the flow of a normally gaseous fluid such as, for example, anhydrous ammonia, includes a hydraulic valve connected to a pressurized vessel holding said normally gaseous fluid, a master cylinder hydraulically connected to said valve and controlling the operation thereof, and a hydraulic connection between the hydraulic valve and master cylinder. In operation, when the manual lever of the master cylinder is depressed, the hydraulic fluid within the self-contained system is pressurized thereby forcing the hydraulic valve open.

1 Claim, 7 Drawing Figures

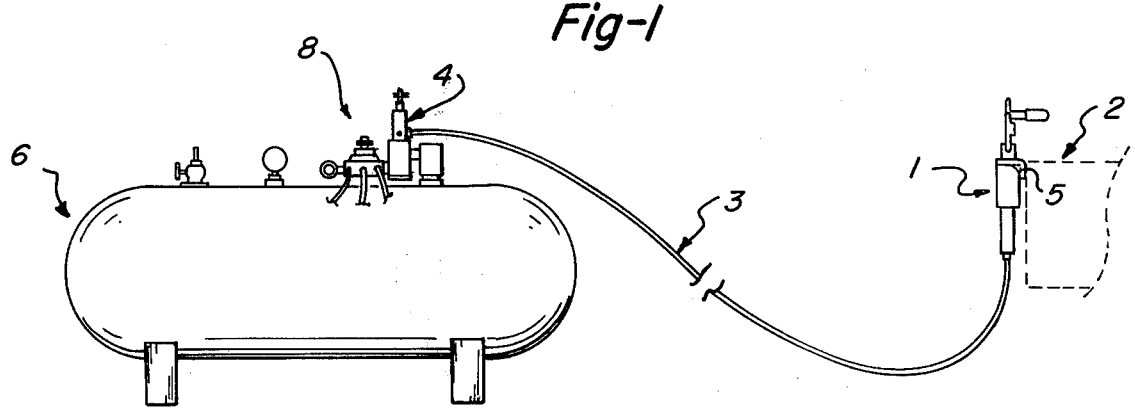
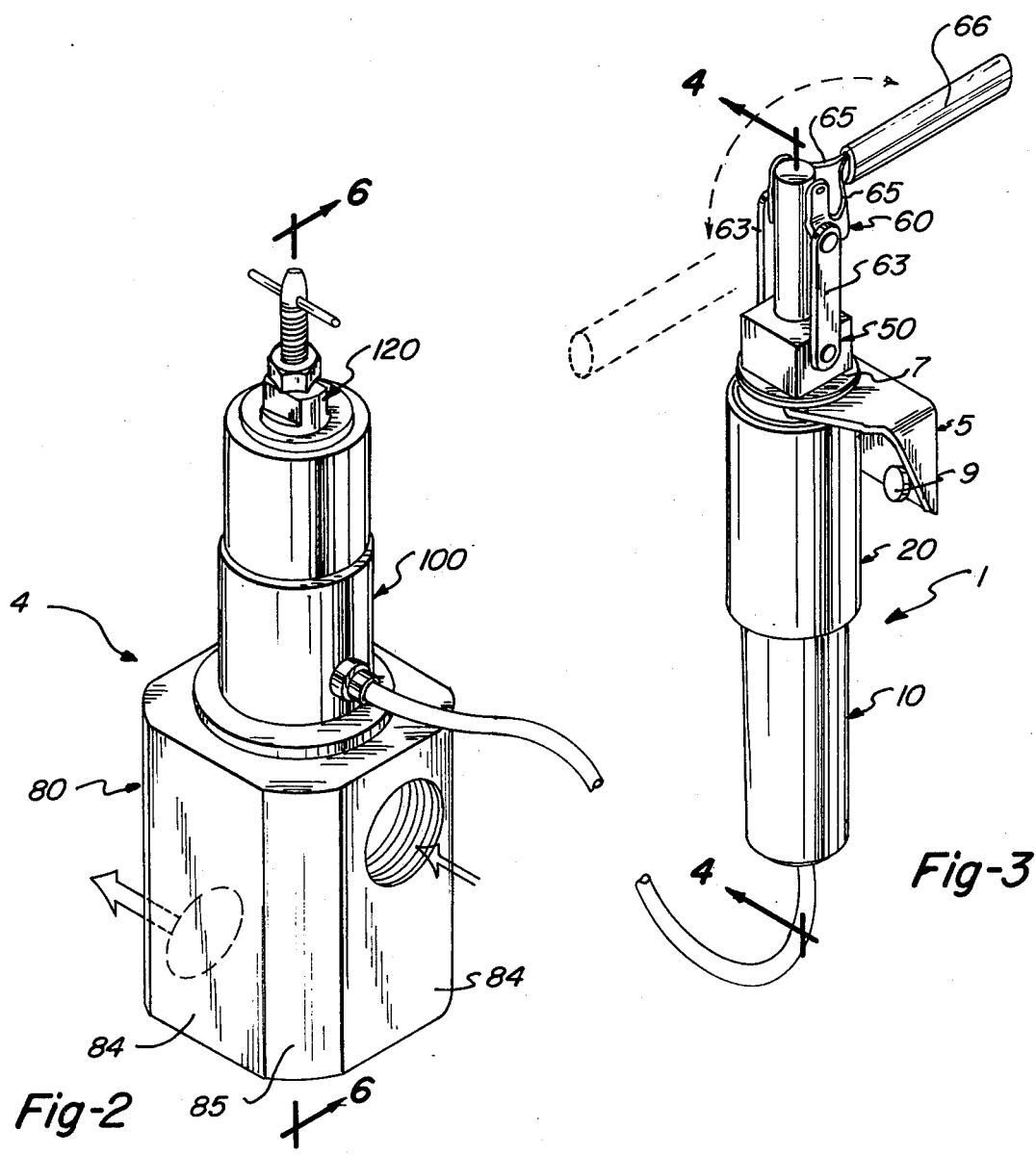

HYDRAULIC VALVE SYSTEM

BACKGROUND OF THE INVENTION

This invention relates to an hydraulic valve system utilized to control the flow of a normally gaseous liquid, and more particularly, to control the flow of anhydrous ammonia to a metering apparatus used in conjunction therewith.

Anhydrous ammonia is a normally gaseous fluid at atmospheric conditions which can be easily stored under pressure as a liquid in any suitable container such as a conventional pressurized vessel. Once released from a pressurized state to ambient conditions the anhydrous ammonia flashes to a gaseous state. One of the uses of anhydrous ammonia is as an agricultural fertilizer. When utilized in this manner, anhydrous ammonia is carried in a pressurized vessel which is fluidly connected to a propelled earth drilling apparatus. A slit is formed in the ground by the drilling apparatus, and the anhydrous ammonia is injected underground. The flow of anhydrous ammonia to the drill is controlled by a valve and a metering apparatus. The valve controls the flow of anhydrous ammonia to the metering apparatus and the metering apparatus controls the amount of flow to the fertilizing knives.

When dispensing anhydrous ammonia in the field, there is a need for remotely controlling the flow of the same from the vehicle both for safety and for conserving time. Since ammonia when in the liquid state can cause burns and when in the gaseous state is extremely irritating to the skin, a need exists for an effective and reliable control system for the valve. Prior art attempts to provide such a system include, for example, remotely controlled, mechanically actuated valves. But such valves are not suited to the needs afore described since the valves are set in the open position and constructed to be closed by mechanical actuation thereby creating an inherent hazard of a closing malfunction. Further, solenoid valves have been utilized (see for example U.S. Pat. No. 3,698,682) but solenoid valves are dependant upon the absence of electrical malfunctions and possess the liabilities of not being easily repaired in the field and requiring modification of conventional metering apparatus to be used in conjunction therewith.

SUMMARY OF THE INVENTION

The system of the invention comprises a hydraulic valve connected to a pressurized vessel holding said normally gaseous fluid, a master cylinder hydraulically connected to said valve and controlling the operation thereof, and a hydraulic connection between the hydraulic valve and the master cylinder. The master cylinder is fixedly secured to a motor vehicle which tows the pressurized vessel and is positioned so as to be easily accessible to the operator thereof. In operation, when the lever of the master cylinder is depressed, the hydraulic fluid within the self-contained system is pressurized thereby forcing the hydraulic valve open.

OBJECTS OF THE INVENTION

It is an object of the present invention to provide a safe and reliable hydraulic valve system for use in conjunction with dispensing a normally gaseous fluid such as, for example, anhydrous ammonia.

It is a further object of this invention to provide a self contained hydraulic valve system which has a built-in safety factor in that if the closed, self-contained hydraulic system developes a leak or is partially destroyed in an accident or by any other means, the hydraulic valve will automatically close in response thereto.

Still a further object of this invention is to provide a hydraulic valve system which is of relatively simple mechanical construction and thereby relatively easily repaired and is readily installed in a dispensing apparatus.

BRIEF DESCRIPTION OF THE DRAWINGS

In the accompanying drawings of various illustrative and presently preferred embodiments of the invention, and in which like reference numerals are employed to designate like parts:

FIG. 1 is a perspective view of one form of a self-contained hydraulic system of the present invention as installed;

FIG. 2 is a perspective view of a portion of the hydraulic valve of the present invention;

FIG. 3 is a perspective view of the master cylinder of the present invention;

DETAILED DESCRIPTION

Referring now to FIG. 1, one form of a self-contained hydraulic valve system of the present invention, is shown. The master cylinder of the present invention, illustrated generally at 1, is shown attached to a motor vehicle such as, for example, a tractor, which is adopted for hauling or pulling a trailer carrying a pressurized tank containing a normally gaseous fluid. The master cylinder may be located inside or outside the cab of the motor vehicle, but in any event should be readily accessible to the operator of said motor vehicle. The master cylinder is connected to hydraulic valve, generally indicated at 4, by means of a flexible hose or tubing 3. The hydraulic valve 4 is connected to and controls the flow from the pressurized vessel 6 to a metering apparatus 8 conventionally utilized in conjunction with controlling the flow of anhydrous ammonia. This metering apparatus controls the amount of normally gaseous fluid which flows past it and the hydraulic valve controls the flow to the metering apparatus, i.e. a start, stop flow function.

Figure 4:
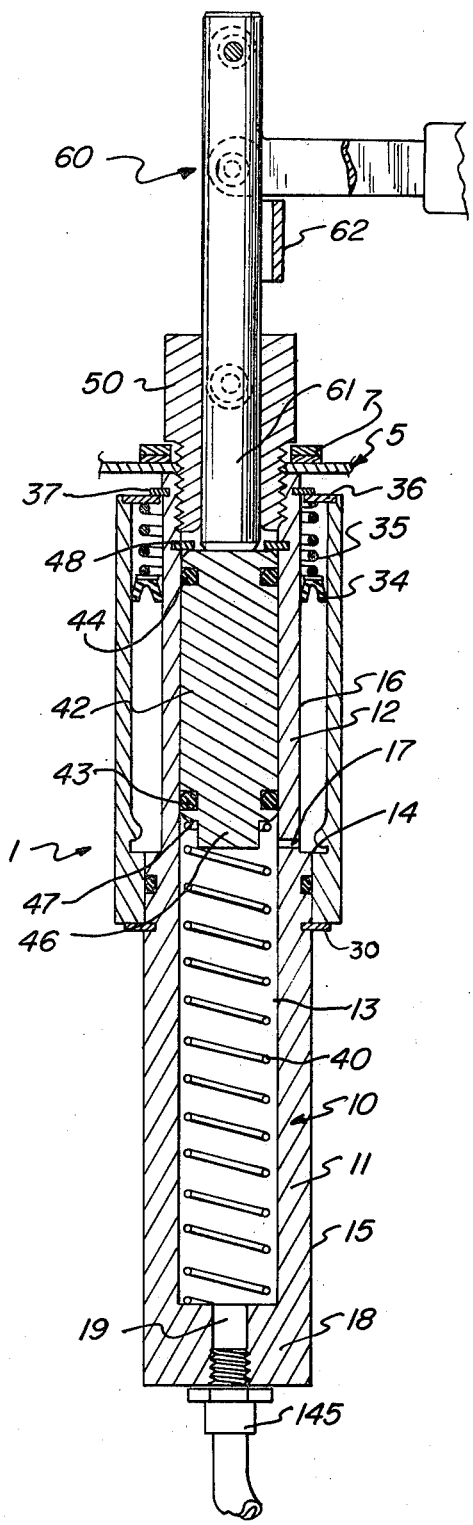
FIG. 4 is a cross-sectional view of the master cylinder of the present invention taken along line 4—4 of FIG. 3.
Figure 5:
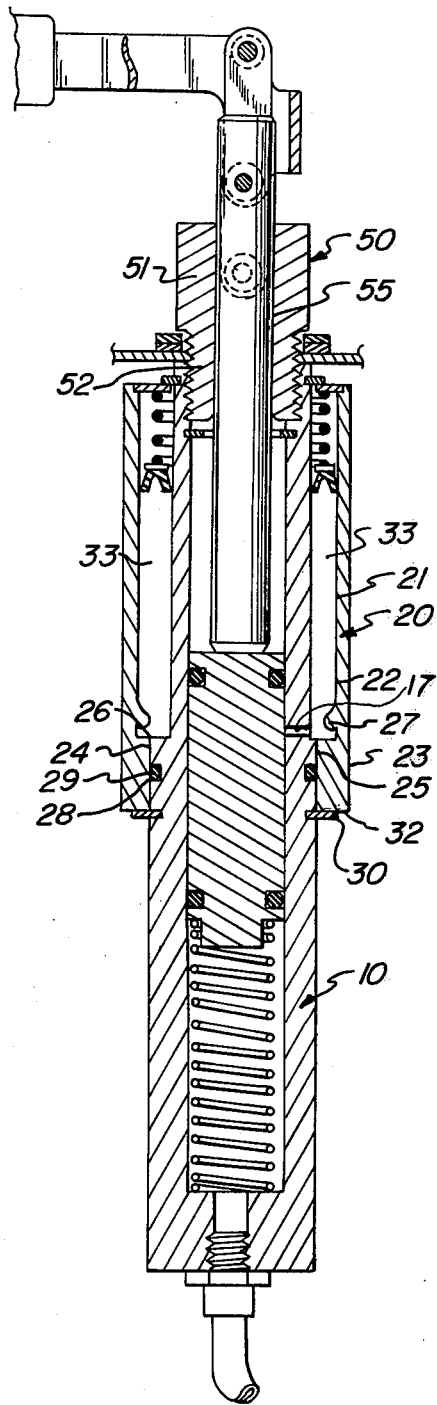
FIG. 5 is a cross-sectional view of FIG. 4, with the lower member of the master cylinder depressed.

Referring now to FIGS. 3, 4 and 5, the master cylinder of the self-contained hydraulic valve system of the present invention is shown in greater detail. In general, the master cylinder 1 comprises a master cylinder housing 10, a reservoir housing 20, a master cylinder cap 50 and an activating means 60. The master cylinder housing 10 comprises a lower, hollow cylindrical housing portion 11 and an upper, hollow cylindrical housing portion 12. The master cylinder housing 10 possesses an interior, uniform diameter cylindrical surface 13. The lower portion 11 of the cylindrical housing, also, possesses an exterior, uniform diameter cylindrical surface 15, and the upper portion 12 of the cylindrical housing possesses an exterior uniform cylindrical surface 16. A circumferential shoulder 14 is defined between the exterior cylindrical surfaces of the upper and lower portions of the housing, the shoulder itself partially defining the bottom of a master cylinder reservoir as hereinafter described. Directly above the shoulder one or more ports are provided through the upper cylindrical housing which allow for communication between the interior of the cylindrical housing, i.e. the lower cylinder reservoir, and the master cylinder reservoir as defined hereinafter. The uppermost or outlet portion of the interior cylindrical surface is threaded. The lowermost portion of the master cylinder housing terminates in a closed end 18 having a threaded port 19 therethrough, for mating with a male end of the hose or tubing, e.g. 145. The reservoir housing, shown generally at 20, comprises a cylindrical shell 21 of a predetermined thickness having a uniform diameter exterior cylindrical surface 23, and an interior uniform diameter cylindrical surface 22 with a reduced diameter portion 24 at its lower extremity defining an interior, circumferential shoulder 26 which partially defines the bottom of a master cylinder reservoir as hereinafter described. The lower cylindrical housing is provided with a circumferential groove 28 in its exterior surface positioned so that when circumferential shoulders 14 and 26 are aligned in the same horizontal plane, both the upper and lower surfaces of groove 28 abut the reduced diameter portion 24. A resilient o-ring 29 is inserted within the groove 28, thereby sealing the bottom of the master cylinder reservoir. The master cylinder housing 10 and the reservoir housing 20 are fixedly secured together in this position by means of a snap ring 30 which fits within a circumferential groove cut in the exterior cylindrical surface 15 and abuts the annular lower end 32 of the reservoir housing 20. The annular space between the exterior cylindrical surface 16 and the interior cylindrical surface 22 defines the master cylinder reservoir 33 which is bounded on the bottom by circumferential shoulders 14 and 26 and on the top by resilient, chevron seal ring 34. The seal ring is below a resilient coil spring 35. An annular ring 36 is positioned upon an internal circumferential shoulder at the upper edge of reservoir housing 20 and held in that position by means of a resilient locking ring 37 which is directly above the annular ring and fits within a circumferential notch appropriately cut from exterior cylindrical surface 16. An annular shoulder 27 is formed on the interior cylindrical surface 22 directly above the ports 17 thereby providing a stop for seal ring 34 and preventing the seal ring from blocking ports 17.

A second resilient spring 40 is placed within the master cylinder housing and abuts the interior surface of closed end 18. Also placed within the master cylinder housing and vertically above resilient spring 40 is cylinder 42 which is provided with upper and lower resilient, sealing o-rings 43 and 44 which fit in grooves therein. The upper and lower edges of the cylinder are chamfered. The lower end of the cylinder is provided with a downwardly extending cylindrical protrusion 46 holding the upper spring end. In the fully assembled position, the upper coil of spring 40 abuts the annular shoulder 47 and the protrusion 46 extends within the interior of coil spring 40 thereby stabilizing and centralizing the coil spring within the master cylinder housing. The spring 40 acts to force cylinder 42 upwardly within the master cylinder chamber, the upper limit of movement being controlled by locking ring 48 which fits within a groove cut in the interior cylindrical surface 13 just below the threaded end. The locking ring 48 extends radially inwardly into the master cylinder so as to abut the upper surface of master cylinder 42 when spring 40 freely acts against the cylinder.

A master cylinder cap 50 with a bore 55 with an upper portion 51 and a threaded portion 52, engaging the master cylinder. The master cylinder cap is provided with a uniform diameter bore 55 therethrough and sized to permit reciprocal insertion therethrough of a plunger 61, to be hereinafter described. An activating means 60 is provided vertically atop the master cylinder cap and is attached thereto. The activating means comprises a solid cylindrical plunger 61 which may be made from, for example, brass. The plunger is sized so as to freely reciprocate within the bore extending through the master cylinder cap. The plunger may be reciprocally attached to the cap and may be caused to reciprocate therein by any suitable means, such as for example, the manually actuated lever member of FIGS. 3, 4 and 5. Said lever member comprises an H-shaped, upright mounted member and an L-shaped, forked member. The H-shaped member comprises a back plate 62 and a pair of vertically extending, elongated slats 63, integral with and connected by the back plate. The bottom-most portion of the slats are pivotably connected to opposite sides of the upper rectangular block configuration of the master cylinder cap by any suitable means, such as for example, by rivets as illustrated. The L-shaped, forked member comprises two prong members 65, as best illustrated in FIG. 3, which abut for a portion of the length thereof and are covered with a suitable material 66 such as, for example, a plastic, thereby forming a handle capable of safe manual manipulation. From such abutment the two prong members are diverted outwardly apart, then extend in a parallel direction, are diverted perpendicularly and finally are diverted inwardly. At the point when the forks are diverted perpendicularly, each fork is attached to the uppermost portions of one of the slats 63 by any suitable means such as, for example, by rivets. The extremities of the forks are attached to the uppermost portion of cylindrical plunger 61 by any suitable means such as, for example, a rivet extending through a horizontal bore in the plunger as is illustrated in the drawings.

As previously noted the master cylinder is attached to a motor vehicle such as a tractor, and may be located inside or outside the cab of the motor vehicle but in any event, should be readily accessible to the operator of the vehicle. The master cylinder may be attached to the motor vehicle by any suitable means such as, for example, the bracket illustrated in FIG. 3. Said bracket has a collar formed in its perpendicularly extending flange which the cylinder 52 of the master cylinder cap fits within. A washer 7 is placed around the cylinder 52 and between the collar of the bracket and the upper rectangular block configuration 51 of the master cylinder cap. The cylinder cap is then fully mated with the master cylinder housing thereby fixedly securing the bracket to the master cylinder. Then, the bracket can be mounted in a suitable location. Another alternative, for example, is to mount the master cylinder on the cab of the motor vehicle with the walls of the cab functioning as the bracket plate. A properly sized hole is drilled through a cab wall and the master cylinder cap is mated from the inside of the cab through the hole with the master cylinder housing which is located on the outside of the cab.

Figure 6:
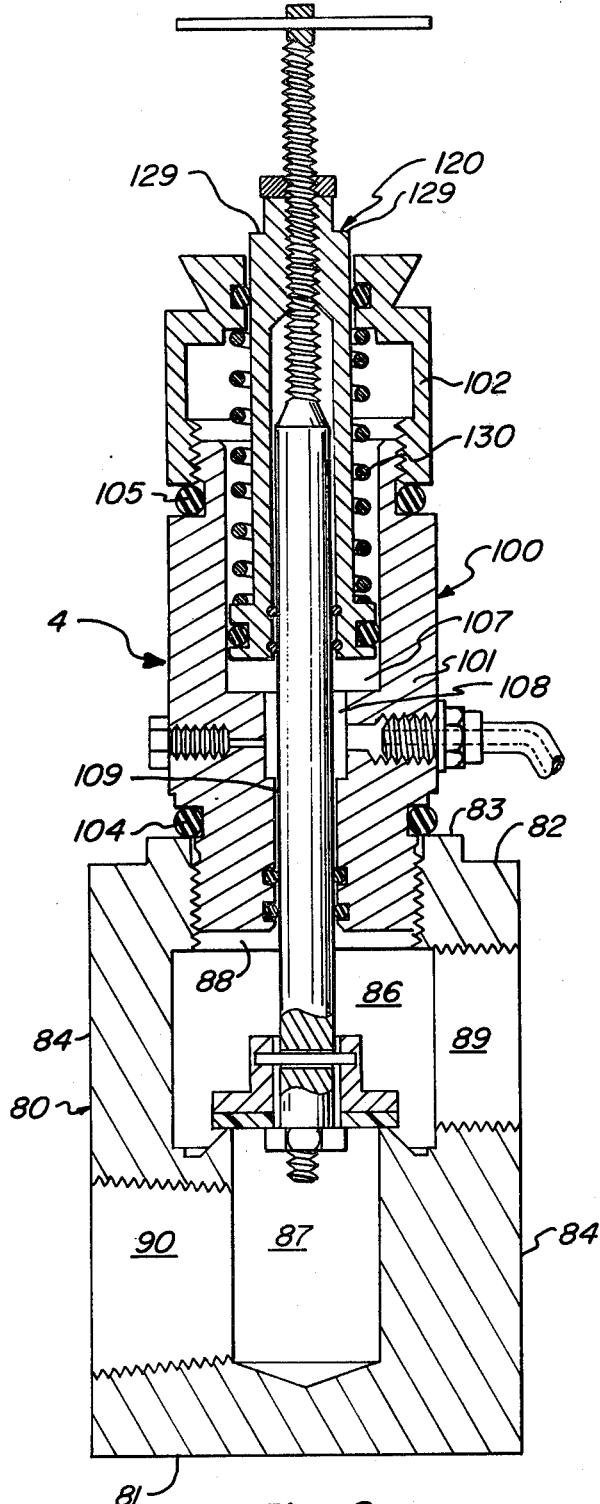
FIG. 6 is a cross-sectional view of the hydraulic valve of the present invention taken along line 6—6 of FIG. 2 and corresponds to the view of the master cylinder shown in FIG. 4.
Figure 7:
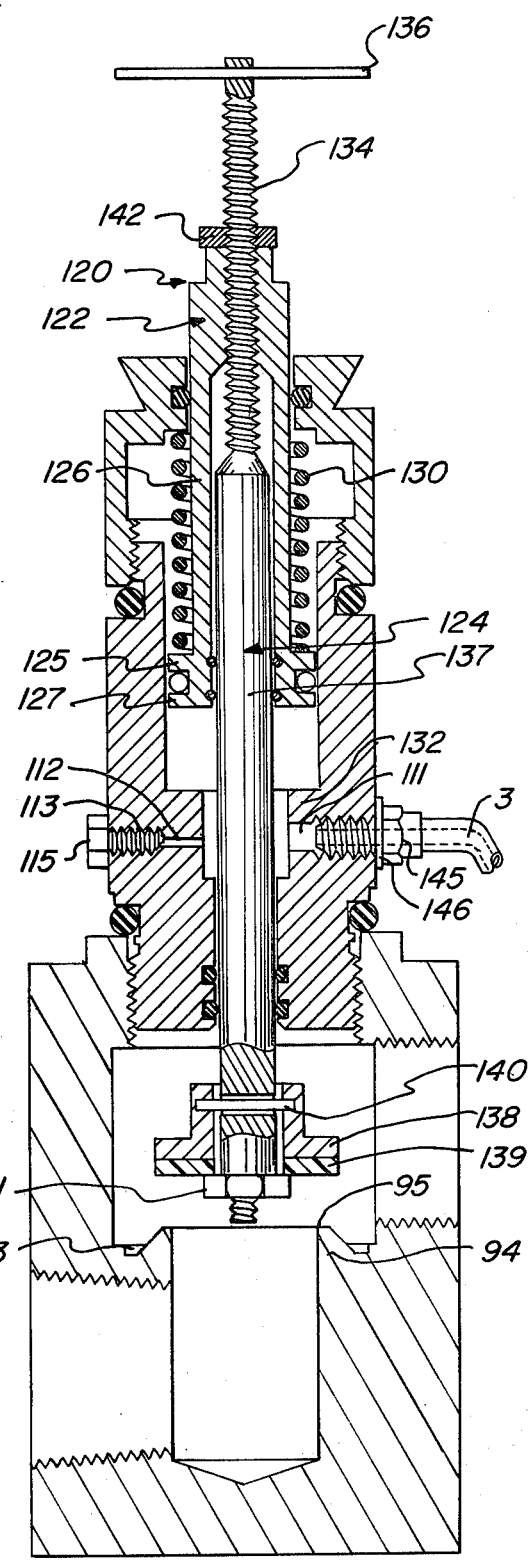
FIG. 7 is a cross-sectional view of the hydraulic valve of the present invention taken along line 6—6 of FIG. 2 and corresponds to the view of the master cylinder shown in FIG. 5.

Referring now to FIGS. 2, 6 and 7, a hydraulic valve is shown generally at 4 and comprises a valve housing 80, a slave cylinder housing 100 and a valve stem means 120. The valve housing 80 has an exterior flat bottom surface 81, an upper surface 82 with a raised annular collar 83, and an octagonal side configuration. The octagon flat side has surfaces 84 possessing corresponding peripheral configurations and rounded corner surfaces 85, also, possessing corresponding peripheral configurations. The housing is provided with a central chamber 86, a lower chamber 87, lateral, cylindrical, threaded bores 88 and 89 communicating with central bore 86. The body, also, includes inwardly tapered, threaded bore 90 communicating with lower bore 87. As best illustrated in FIG. 7, the bottom surface of the central chamber 86 is provided with an annular shoulder 93 and an annular crown portion 94, the top flat annular surface thereof 95 defining a valve seat.

A slave cylinder housing, shown generally at 100, comprises a cylindrical housing 101 and a cap 102 threadedly connected to the top of the cylindrical housing. The cylindrical housing has an outer cylindrical surface, upper and lower annular shoulders cut in the outer, cylindrical surface at the extremities holding O-rings 104 and 105. The upper and lower reduced diameter cylindrical portions, the resilient O-rings 104 and 105 seal the interior and exterior of the slave valve housing. The cylindrical housing is provided with a bore therethrough having an upper relatively large diameter portion 107, an intermediate portion 108 having a reduced diameter, and a lower portion 109 having a still further reduced diameter. Two notches are cut in the interior surface of the lower portion 109 and resilient O-rings are provided therein to seal the bore from communication with the central chamber 86 therebelow. The wall of the cylindrical housing has a threaded port 111 therethrough to provide a female coupling for mating with a male coupling on one end of the hose or tubing. The port 111 communicated with the intermediate portion 108 of the bore. A threaded bleeder port 112 is provided which, also, communicated with the intermediate portion 180 of the bore. A bleeder screw 115 is mated with the threaded portion.

A valve stem means 120 comprises a piston, shown generally at 112, and an elongated valve stem, shown generally at 124. The piston has a head 125 and a cylindrical shaft 126 extending upwardly therefrom. An annular notch is cut in the outer surface of the piston head and a resilient O-ring 127 is provided therewithin. The uppermost portion of the cylindrical shaft 120 has a shoulder 129. A cylindrical bore is provided through the piston which tapers to a threaded smaller diameter bore in the upper end of the piston. Two grooves are cut in the lowermost surface of the bore and seal rings are provided therewithin for the rod 124. A coil spring 130 fits over the cylindrical shaft 126 and abuts the annular top surface of the piston 125. Both the piston and coil spring fit within the slave cylinder housing, with shoulder 132 between the upper and intermediate portions defining a lower stop for the piston and coil spring. The elongated valve stem 124 includes an upper threaded portion 134 threaded in the upper end of the bore through the piston. A lost nut 142 is threaded onto the threaded stem 134. The stem 134 is provided with tee handle pin 136. The threaded stem terminates at its lower end in an increased diameter portion 137 which extends from within the piston, through the bores of the cylindrical housing 101 and into the central chamber 86.

The end of portion 137 is threaded. The lowermost section of portion 137 is provided with a fitting 138. The fitting has an annular resilient seal member 139 fixedly attached thereto. A nut 141 holds seal member 139 on the stem. The fitting 138 is held by a pin 140.

A flexible hose or tubing 3 connects the master cylinder 1 to the hydraulic valve 4. Any suitable flexible, hydraulic hose or tubing may be employed. Each end of the flexible hose or tubing is provided with threaded fittings, ie male plugs 145 which is attached to the hose or tubing by any suitable means such as, for example, crimping.

The system of the present invention, when fully assembled and operational, is a self-contained hydraulic system. The operation of the system depends only upon the self-induced pressure on the hydraulic fluid, and does not depend in any way upon the pressure of the anhydrous ammonia. The system is initially charged with hydraulic fluid in the following manner. First, the lever member of the master cylinder is placed in an undepressed position, as shown in FIG. 4, and the male plug 145 on one end of the hose or tubing is connected to the threaded lower end of port 19. The other end of the hose is left free and unconnected to the hydraulic valve. Next, the master cylinder cap 51, the locking ring 37, annular ring 36, coil spring 35 and seal ring 34 are unconnected and removed from the master cylinder. The free end of the hose is charged with hydraulic fluid by any suitable means such as, for example, an oil or "squirt" can. The hydraulic fluid flows through the hose, into the lower cylinder reservoir and through ports 17. Once the hydraluic fluid flows through ports 17 into the master cylinder reservoir, the hose and lower cylinder reservoir have been filled and introduction of hydraulic fluid into the free, unconnected end of the hose is terminated taking care not to lose any hydraulic fluid therefrom. Thereafter, the master cylinder reservoir is filled from the top thereof and the seal ring 34, coil spring 35, annular ring 36, locking ring 37 and master cylinder cap 51 are reassembled with and connected to the master cylinder. Since the master cylinder is now fully charged with hydraulic fluid, the hydraulic valve is filled by first removing the bleeder screw 115 therefrom and introducing hydraulic fluid into port 111 until such fluid is ejected through bleeder port 112. The bleeder screw is recoupled with the threaded portion of the bleeder port and the male plug on the free end of the hose or tubing is coupled to the threaded outer end of port 111, making sure the hose remains full of hydraulic fluid. Then, the hydraulic valve is held at a higher vertical position than the remaining system to allow any air to rise to the bore therein. Once all the air bubbles have reached the bore, the lever of the master cylinder is depressed while the bleeder screw is concurrently removed to force the air through the bleeder port 112 and out of the system. Thereafter, the bleeder screw is recoupled and the system is completely charged with hydraulic fluid.

It should be noted that the hydraulic fluid utilized may be any suitable, conventional hydraulic fluid such as, for example, a petroleum base oil, but not a conventional brake fluid as such may cause the resilient O-ring seals to expand and thereby render the system inoperative.

Once the system is charged and installed, it operates as follows. When the lever on the master cylinder is undepressed (FIG. 4), the annular resilient seal member 139 is seated on valve seat 95 and the action of coil spring 130 and pressurized fluid within central chamber 86 from inlet bore 89 insures the sealing closure of seal member 139 against the valve seat 95. The tension of the seal member against the valve seat 95 in this position can be adjusted accordingly by turning pin 136 to increase or decrease the acting force. To open the valve, the lever of the master cylinder is depressed as shown in FIG. 5, thereby forcing plunger 61 and cylinder 42 downward within the lower cylinder reservoir, blocking ports 17 and forcing hydraulic fluid through the hose or tubing and into the bores 107, 108 and 109. The fluid is sealed therewithin by the O-rings 127 and the two O-rings in the lower surface of bore 109 and therecoming the forces of coil spring 130 and the pressurized fluid within central chamber 86 and unseating seal member 139 from valve seat 95. In this unseated position, the normally gaseous fluid within the pressurized vessel is allowed to flow from inlet bore 89 through chambers 86 and 87 and through outlet bore 90 to the metering apparatus. The system has a built-in safety feature in that once any portion of the self-contained hydraulic system develops a leak, the system depressurizes thereby closing the valve.

It should be noted that although the hydraulic valve system of the present invention has been described as being utilized for controlling the flow of anhydrous ammonia and in conjunction with metering apparatus therefor, the system can be employed to control the flow of any gaseous fluid and in conjunction with flow control devices other than metering apparatus. Therefore, while inventive concepts have been disclosed herein in reference to a presently preferred and illustrative embodiment of the invention, it is contemplated that these concepts may be variously employed and embodied in alternate structure. It is intended that the appended claims be construed to cover alternate embodiments of the inventive concepts except insofar as precluded by the prior art.

What is claimed is:
1. A remote control for an hydraulic fluid flow valve for a pressurized vessel fluid outlet comprising:
  (a) master hydraulic cylinder means arranged to be mounted in a general vertical condition for operation and having a fluid outlet at one end and a closure at the opposite end and a small bore intermediate thereof;
  (b) free piston means reciprocably mounted in said cylinder, said free piston being elongated and including an O-ring seal adjacent each end for sealing hydraulic fluid between said free piston and said fluid outlet;
  (c) plunger means reciprocably mounted through said closure in contact with said free piston;
  (d) pivoted lever means arranged to depress and release said plunger means;
  (e) coil spring means in said cylinder means biasing said free piston means toward said closure;
  (f) annular, concentric, tubular reservoir means around said cylinder means, said annular reservoir extending only substantially midway along the length of said cylinder and being sealed to said cylinder by means of an O-ring; and a small passageway providing communication between said reservoir means and said cylinder means, whereby said spring normally biases said piston means adjacent said closure means opening said reservoir to said cylinder means and depression of said plunger forces hydraulic fluid to the hydraulic fluid flow valve for opening the same;
  (g) an annular seal mounted in said annular reservoir in the end opposite said small passageway, and coil spring means biasing said annular seal toward said small passageway, and means in said annular reservoir for preventing movement of said annular seal over said small passageway.

* * * * *